United States Patent [19]

Toulhoat et al.

[11] Patent Number: 4,596,785
[45] Date of Patent: Jun. 24, 1986

[54] GROUP VIII AND VIB METAL SULFIDE CATALYSTS, THEIR MANUFACTURE AND THEIR USE FOR HYDROTREATING HYDROCARBON CUTS CONTAINING SULFUR

[75] Inventors: Hervé Toulhoat, Houilles; Régis Paulus, Villeurbanne; Yves Jacquin, Sevres, all of France

[73] Assignee: Institut Francais du Petrole, Rueil-Malmaison, France

[21] Appl. No.: 653,643

[22] Filed: Sep. 24, 1984

[30] Foreign Application Priority Data

Oct. 25, 1983 [FR] France .................................. 83 16944

[51] Int. Cl.$^4$ ............................................. B01J 27/051
[52] U.S. Cl. ..................................... 502/220; 502/221; 502/313; 502/314; 502/315
[58] Field of Search ............... 502/313, 314, 315, 220, 502/221

[56] References Cited

U.S. PATENT DOCUMENTS 3,660,480  5/1972  Pregaglia et al. .................... 502/315
3,716,497  2/1973  Courty ................................. 502/315

OTHER PUBLICATIONS

Candia et al., Bull. Soc. Chim. Belg., vol. 90, No. 12, 1981, pp. 1125–1232.
Breysse et al., "Symposium on Structre . . . Before the Petroleum Chemistry, Inc., Amer. Chem. Soc., K.C. Meeting, 9/12–17/82, pp. 772–781.

*Primary Examiner*—Andrew H. Metz
*Assistant Examiner*—Chung K. Pak
*Attorney, Agent, or Firm*—Millen & White

[57] ABSTRACT

This invention concerns a method of preparing catalysts and certain catalysts which can be obtained by the method. The method comprises (a) coprecipitating at least a group VIII metal sulfide with at least a group VIB metal sulfide, at a pH maintained at a value of 4.5 to 8; (b) separating the resultant precipitate; (c) drying the precipitate; and (d) calcining the dried precipitate; all the steps being effected under an inert atmosphere. The catalysts have a stoichiometry of 1.2 to 2.2 atoms of sulfur per metal atom, a crystallographic structure of molybdenite for the group VIB metal sulfide(s) and pyrite for the group VIII metal sulfide(s) and characterized by an X-ray diffraction powder pattern having at least two principal peaks a and b of the disulfide of each group VIB metal used (peaks a, b, c, d), and two principal peaks f and j of the disulfide of each group VIII metal used, (peaks e, f, g, h, i, j, k), the height of the principal peak of a group VIII metal monosulfide (1), if it appears being less than 5 times that of the principal peak (f) of the disulfide of the same metal, which are particularly active for all reactions between hydrogen and a mixture of hydrocarbons containing sulfide compounds.

18 Claims, 11 Drawing Figures

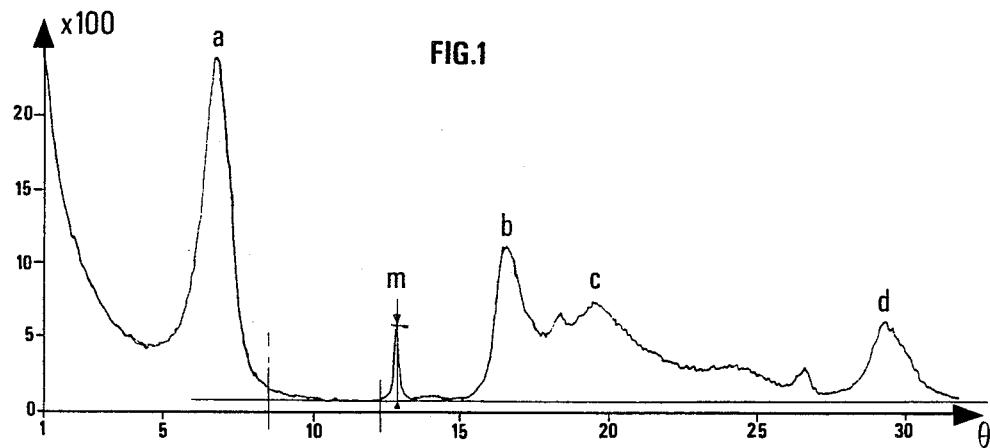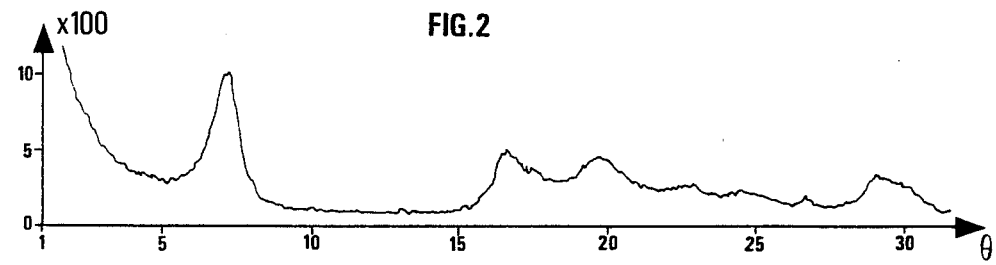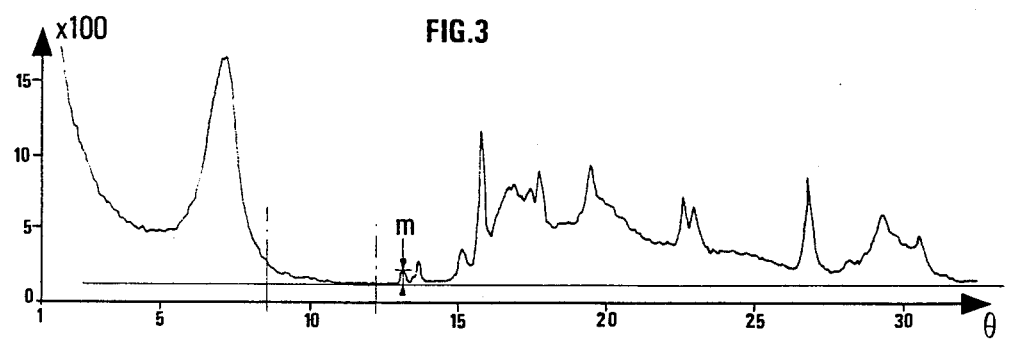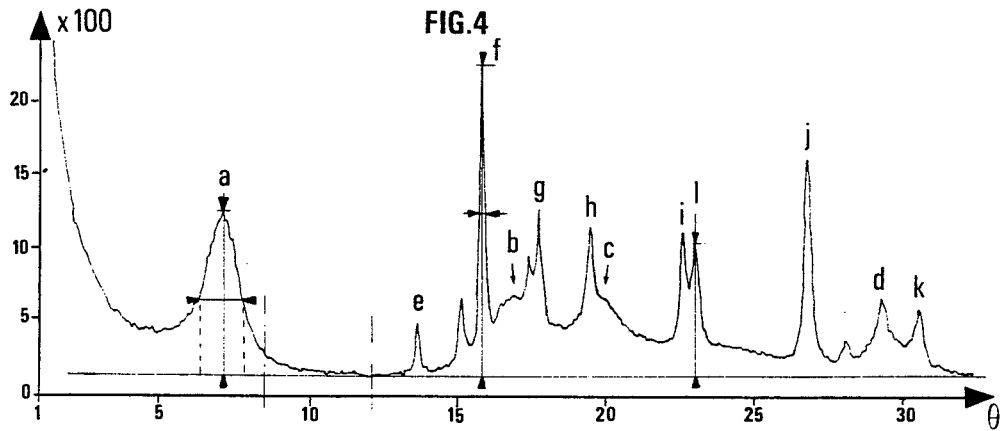

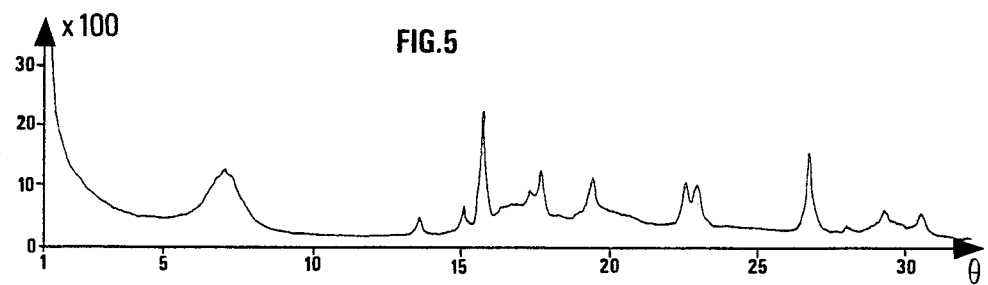
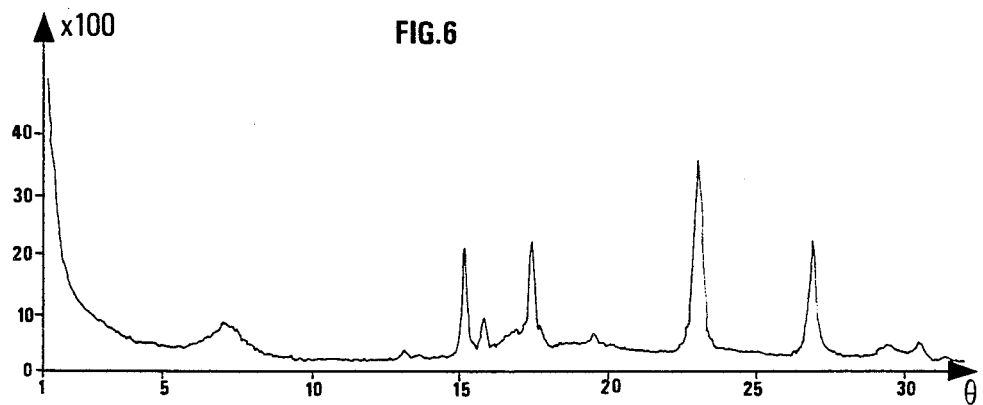
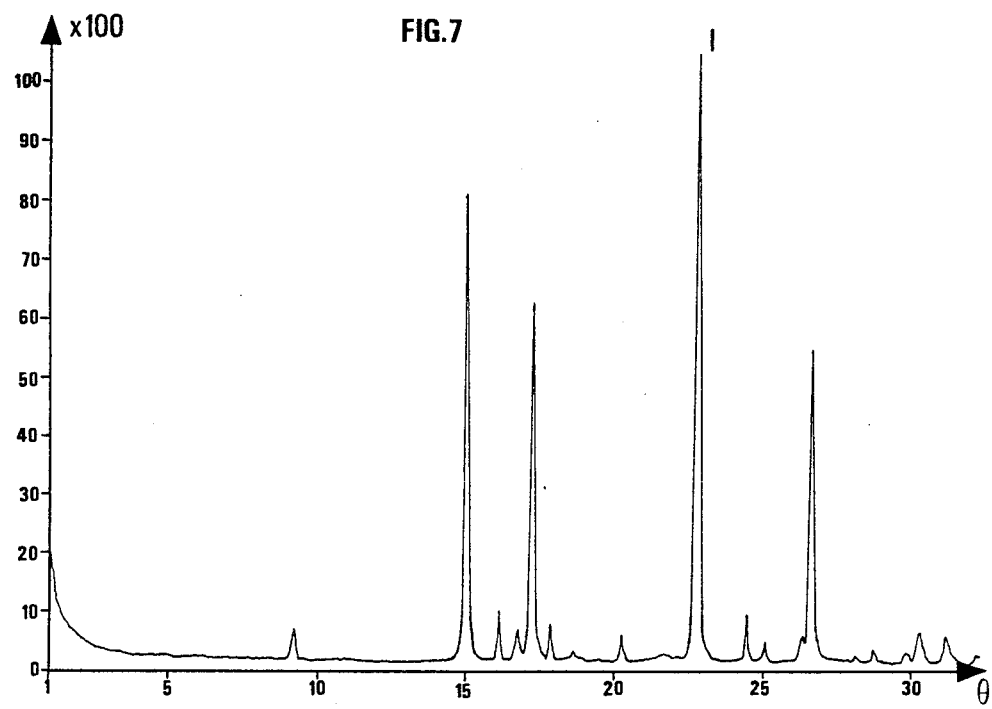

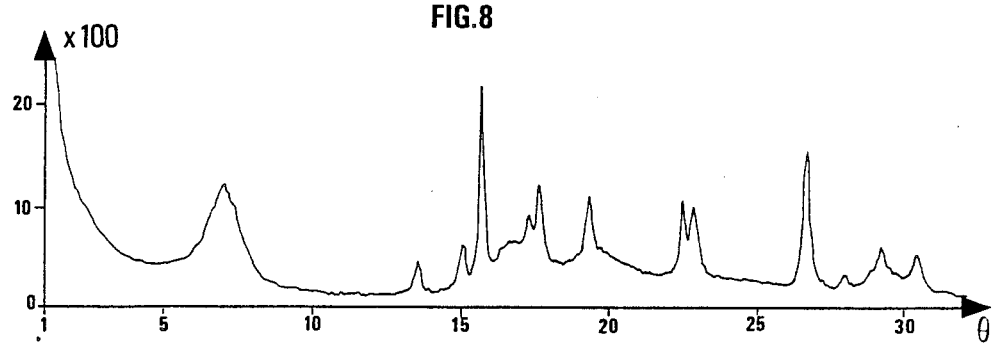
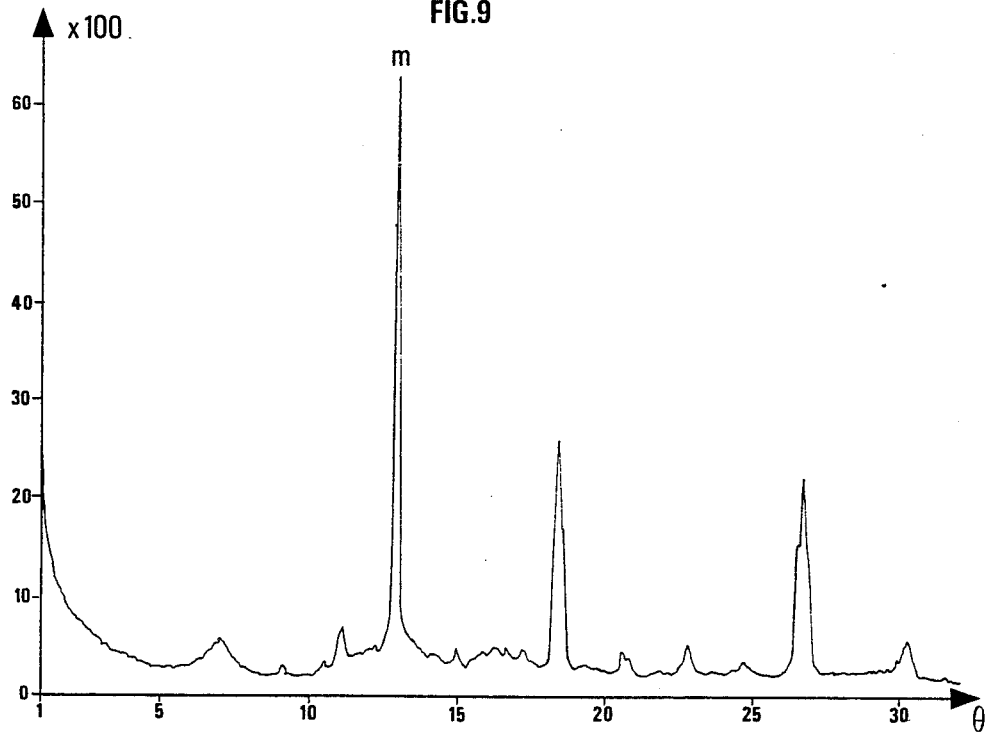

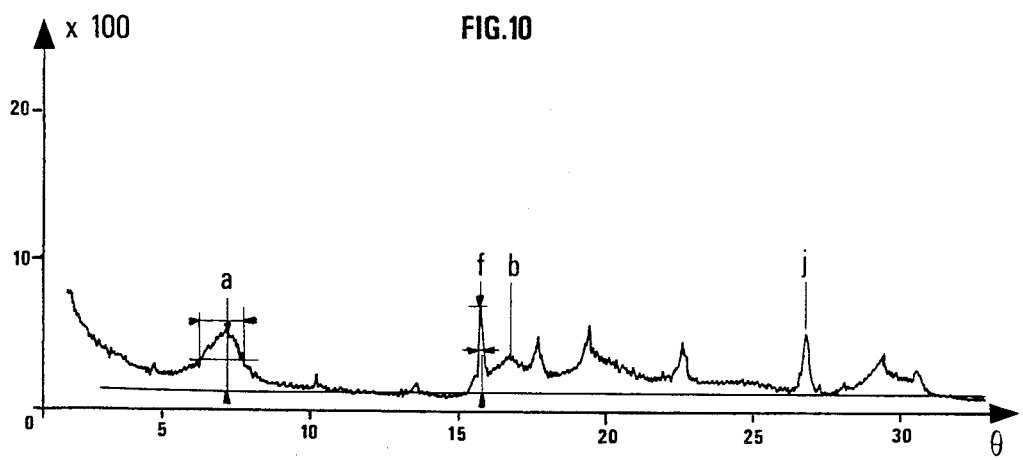
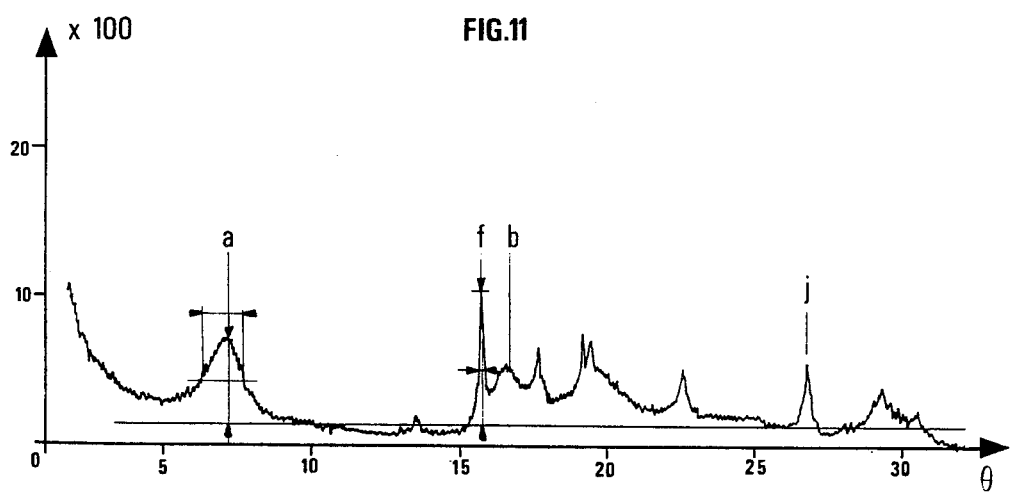

GROUP VIII AND VIB METAL SULFIDE CATALYSTS, THEIR MANUFACTURE AND THEIR USE FOR HYDROTREATING HYDROCARBON CUTS CONTAINING SULFUR

BACKGROUND OF THE INVENTION

The use of group VIB metals and combinations thereof with group VIII metals as active components for the preparation of catalysts having very high activity in hydrorefining reactions has been well known for many years. At the present time, the most active catalysts known to the art combine with the aforementioned metals a catalyst support having a refractory oxide base, e.g., alumina, silica or silica-alumina.

Supported hydrorefining catalysts are most often sold in the "oxide" form, that is, after having been subjected to calcination at an elevated temperature in the presence of air, such that the active metals are chemically linked to oxygen. However, hydrorefining of hydrocarbon cuts containing sulfur impurities results in hydrodesulfuration by the hydrogen, with hydrogen sulfide as the product. Consequently, the stable forms of the active metals contained in the catalysts during use, in the reaction atmosphere and under the operating conditions, are the sulfides. It is also well known to the art that it is the association of the metal sulfides of the group VIB and VIII metals which constitutes the active component of these catalysts, such that their industrial use always begins by a presulfuration step, which determines the level of activity which will result during use.

The precise crystallochemical nature of the sulfides which form on the supported catalysts is not known and cannot be directly determined by radio-crystallagraphic methods or by electron microscopy, as attested to, for example, in the scientific literature, e.g., *Bull Soc. Chim. Belges*, 90, No. 12, (1981) and *Transactions of the Fourth International Congress on the Chemistry and Applications of Molybdenum*, held on August 8-16, 1982, at Golden, Colo., USA. In particular, the presence of a disulfide of a group VIII metal has never been observable in a supported sulfided hydrorefining catalyst.

The prior art has also known non-supported catalysts associating group VIB and group VIII metal sulfides. For example, the catalyst denoted 3076, sold by I. G. Farben Co., is known and described in the CIOS report, Volume XXXII-107, pages 115-124, published in 1945. This catalyst associates nickel monosulfide NiS with tungsten disulfide $WS_2$ in a molar ratio of 2:1. The sulfides are obtained by treatment of a mixture of nickel carbonate + tungstic acid at a temperature of 420°-460° C. with a mixture of $H_2 + H_2S$. U.S. Pat. No. 2,394,739 discloses a method of preparing a hydrogenation catalyst composed equally of a mixture of nickel monosulfide and tungsten disulfide, according to which an aqueous solution of nickel nitrate is added to an ammoniacal solution of ammonium thiotungstate and ammonium sulfide in excess. The nickel monosulfide precipitates, after which the solution is acidified to pH 2 and tungsten trisulfide precipitates. It is also possible to add an acidic solution of nickel nitrate to the thiotungstate solution. In all cases, the precipitate is reduced in the presence of hydrogen after drying.

Pratt et al studied a series of sulfided catalysts based on nickel and molybdenum which they prepared: *J. Catalysis*, 66, 82-92 (1980). Their method of preparation comprises a continuous coprecipitation starting with aqueous solutions of nickel nitrate and ammonium heptamolybdate, in the absence of sulfur. Drying and calcination of the precipitate in air for four hours at 400° C. produces a finely divided mixture of nickel and molybdenum oxides. After sulfuration in situ by 20% by volume $H_2S$ in $H_2$ during four hours at 400° C., these mixtures were tested for their catalytic activity in hydrogenolysis of thiophene. After the tests, the catalysts were characterized. One of the most active catalysts, corresponding to an atomic ratio (nickel/nickel+molybdenum) of 0.73, had a specific surface of about 50 $m^2/g$, a total stoichiometry of about 1 atom of sulfur per metal atom, and the presence of $MOS_2$, $NiS_2$ and NiS in the catalyst was detected by X-ray diffraction.

U.S. Pat. No. 4,303,634 describes the preparation of a non-supported catalyst of molybdenum disulfide by thermal decomposition in an inert atmosphere of an ammonium salt of molybdenum sulfide obtained by the reaction between molybdenum trioxide and ammonium sulfide. U.S. Pat. No. 4,243,554 describes an analogous method for obtaining an analogous catalyst, starting with an ammonium thiomolybdate salt of well defined composition. Thus, these patents describe methods of preparing catalysts which only contain molybdenum.

Topsoe et al, *J. Catalysis*, 68, 433-452 (1981), and Candia et al, *Bull. Soc. Chim. Belges*, 90 (12), 1225-1252 (1981), have described a method of preparing non-supported catalysts comprising mixed sulfides of cobalt and molybdenum, the method being called "HSP", standing for "Homogeneous Sulfide Precipitation", according to which an aqueous solution of cobalt nitrate and ammonium heptamolybdate, having a predetermined atomic ratio Co/Mo, is added to a solution of 20% by weight of ammonium sulfide at a pH higher than 10, maintained between about 60°-80° C. under vigorous agitation, the added solution having also been brought to the same temperature. The reaction is effected in air and the mixture is maintained at temperature with stirring until all of the water is evaporated. The resultant precipitate, which is the prescursor of the final catalyst, is then treated with a stream of 2-6% by volume of $H_2S$ and $H_2$, at a temperature of between 320°-400° C., for four hours, for a final sulfuration, then cooled under nitrogen and conditioned under argon. Catalysts prepared by the HSP method, characterized by Candia et al by X-ray diffraction, were shown to consist of a single homogeneous phase analogous to molybdenite. Another variant of the HSP method was described by Breysse et al, *184th ASC National Meeting, Div. Pet. Chem.*, Kansas City, Sept. 12-17, 1982. According to this variant, it is a dilute solution of ammonium sulfide which is added slowly to a very dilute solution of ammonium heptamolybdate and cobalt nitrate having a predetermined atomic ratio Co/Mo. An inert atmosphere is not used. After evaporation of water, the recovered solid is resulfided under 15 volume per cent $H_2S$ in $H_2$, for four hours, at 400° C.

SUMMARY OF THE INVENTION

A method has now been discovered for preparing solid non-supported catalysts of high activity, often more active than supported catalysts, which themselves were previously thought of as more active than non-supported catalysts in the prior art, especially in refining operations, in the presence of hydrogen, of hydrocarbon cuts containing sulfur impurities, among others.

This particular method for synthesizing non-supported catalysts comprising mainly an intimate mixture of at least a group VIB metal sulfide with at least one group VIII metal sulfide comprises the following steps:

(a) reacting an aqueous solution of at least one soluble salt of at least one group VIII metal and at least one ammonium salt of a polyanion of at least one group VIB metal, at a pH maintained at a value of 4.5 to 8, with at least one water-soluble sulfiding agent, in such manner as to form a coprecipitate of sulfides;

(b) separating the resultant precipitate from the mother liquor;

(c) drying the precipitate; and (d) calcining the dried precipitate, all of the steps being effected under an inert atmosphere.

The proportions of reactants used during step (a) are advantageously such that the ratio of the number of atoms of the group VIII metal to the total number of metal atoms is from 0.35 to 0.95 preferably from 0.50 to 0.85, and the ratio of the number of sulfur atoms to the total number of metal atoms is from 1.2 to 2.2, preferably near 2, for example, from 1.70 to 2.05.

A preferred class of catalysts which are particularly readily obtained according to the method of the present invention comprises catalysts containing, in intimate mixture, at least one group VIB metal sulfide and at least one group VIII metal sulfide, these sulfides having a stoichiometry of 1.2 to 2.2 atoms of sulfur per metal atom, preferably a stoichiometry near 2, for example, 1.70 to 2.05, and a ratio of the number of group VIII metal atoms to the total number of metal atoms of 0.35 to 0.95. The crystallographic structure of these catalysts has a molybdenite structure for the group VIB metal sulfide(s) and a pyrite structure for the group VIII metal sulfide(s), the combination of sulfides being characterized by an X-ray diffraction powder pattern at the copper $K_{alpha}$ peak wave length having at least two principal peaks, and preferably the four characteristic principal peaks, of the group VIB metal disulfide(s), the height of the peak denoted (002) of the Miller indices being situated at a Bragg angle of 7.0–7.3 degrees and its angular width at half-height being from 0.5 to 1.5 degrees. The X-ray diffraction powder pattern also shows at least the two principal peaks, and preferably the seven principal peaks, of the disulfide of each group VIII metal used, the angular width at half-height of the most intense peak denoted (200) in the Miller indices of the major group VIII metal disulfide being from 0.05 to 1 degree, the diffraction intensity at the height of this peak being greater than that of the diffraction intensity at the height of the (002) peak of the major group VIB metal disulfide. The diffraction diagram is such that if the peaks characteristic of a group VIII metal monosulfide appear, the height of the principal peak (100) is less than five times that of the principal peak (200) of the disulfide of the same metal, and such that, if the characteristic peaks of the major group VIB metal dioxide appear, the height of the principal peak (110) of the dioxide is less than 0.5 times that of the principal peak (002) of the disulfide of the same metal.

The catalysts may be formed without modification, or they may be mixed, e.g., mechanically, with a clay binder, with a porogen, or with a refractory oxide such as, e.g., alumina, silica or a silica-alumina. The present invention also relates to the use of these catalysts in the various reactions used in hydrorefining operations of hydrocarbon cuts containing sulfur impurities among others; hydrodesulfuration, hydrodenitrogenation, hydrodemetallation, hydrogenation, hydrodecyclization and hydrocracking.

The group VIII metal is more particularly nickel, cobalt or iron, and the group VIB metal is more particularly molybdenum or tungsten. Advantageously, use is made of the nickel-molybdenum combination, or the cobalt-molybdenum combination, or the nickel-tungsten combination, or the cobalt-nickel-molybdenum combination. Combinations using nickel are preferred.

The sulfiding agent is preferably ammonium sulfide or a water-soluble ammonium or hydrogen polysulfide. It is most often ammonium sulfide.

The preferred conditions of the steps of the method for preparing catalysts according to the invention are described hereinafter in greater detail.

In order to precipitate the sulfides, a tight reaction vessel is prepared, containing distilled and degassed water under mechanical agitation, the water is purged with a current of inert gas to eliminate free molecular oxygen and the current of purged gas is maintained thereafter, so that the inert gas saturates the liquid reaction solution and the gaseous atmosphere of the vessel. The inert gas can be, with the exclusion of pure oxygen or oxygen diluted by another gas, any other gas, e.g., nitrogen, carbon dioxide or a rare gas such as, e.g., helium or argon. Argon is preferred. The vessel is provided with a double junction dual glass electrode permitting continuous measurement of the pH of the reaction mixture to 0.01 pH units. The reaction is maintained at a temperature of 0°–50° C., and preferably at ambient temperature.

The reactants are separately introduced into the vessel, in the form of an aqueous solution containing at least 15% by weight of ammonium sulfide, an aqueous solution of an ammonium salt of a polyanion of a group VIB metal, and an aqueous solution of the nitrate salt of the divalent cation of a group VIII metal. The volumic rates of addition of the reaction solutions are maintained constant and substantially equal to one another. The concentrations of the solutions of the groups VIB and VIII metals are adjusted so that the atomic ratio of the group VIII metal(s) introduced to the total metal atoms introduced into the vessel is equal to the atomic ratio of the group VIII metals to the sum of the metals desired for the final catalyst which is being prepared. During the entire course of the preparation, the pH is maintained at a controlled value as described hereinabove, plus or minus 0.5 pH units, e.g., by controlled separate additions of aqueous nitric or phosphoric acid solutions and of ammonium sulfide. This operation can be effected manually or automatically.

As soon as the reactants are introduced simultaneously into the reaction vessel, the reaction mixture becomes black because of the precipitation of finely divided metal sulfides. The precipitate can be separated from the mother liquors by filtration or centrifugation, either in the course of introducing the reactants, or after the reaction is ended. However, it is preferable to effect the separation during the course of adding the reactants, by continuous centrifugation of the reaction mixture and by recycling the mother liquors to the reaction vessel. The centrifugal acceleration is set between 5400 and 19600 m.s.$^{-2}$ preferably between 5800 and 9800 m.s.$^{-2}$.

The precipitate resulting from the separation in step (b) is preferably shaped by any method known to the art, e.g., extrusion, pelletizing, granulation, or dropforming. Extrusion is preferred.

In this step of the preparation process, it is possible to incorporate into the precipitate an alumina, silica, or silica-alumina gel, a conventional binder such as bentonite, porogens, or any other substance capable of providing the finished catalyst with specific mechanical and/or textural properties. The incorporated materials and the precipitate are malaxed together until a homogeneous paste is obtained, which is then shaped by the most appropriate method. The incorporated material may represent from 5-95%, preferably from 20-60 percent, by weight of the finished catalyst.

After the shaping step, the moist catalyst is introduced into an oven swept by a current of inert gas, preferably the same gas which is used during the coprecipitation step. The specific flow rate of the inert gas is set between 100 and 10,000 liters per liter of precipitate and per hour (NTP).

The catalyst is submitted to a drying step in the oven, under an inert gas, at a temperature between 100 and 150° C., until the relative humidity of the gas stream in the heated zone of the oven becomes lower than 5%. At that point, the temperature of the oven is increased to a value between 300° and 600° C., preferably between 390° and 450° C., during 1-6 hours, preferably 2-5 hours. This calcination under inert gas is the final step for preparing the catalyst, which is then preferably returned to ambient temperature under inert gas and conditioned in a tight vessel under inert gas.

The thus-prepared catalyst can be transferred to a catalytic reactor in which it is to be used without taking special precautions, but it is preferred to effect the transfer without contact with atmospheric air.

The preferred catalysts which can be obtained according to the present process have the following physicochemical characteristics, measured under conditions wherein no other substance is added during the shaping:

The ratio of the number of group VIII metal atoms to the total number of metal atoms is from 0.35-0.95, preferably from 0.5-0.85.

The ratio of the number of sulfur atoms to the total number of metal atoms is from 1.2-2.2, preferably near 2, e.g., from 1.70-2.05.

The specific surface measured by nitrogen sorptometry is from 10-200 m$^2$/g, preferably from 40-60 m$^2$/g.

Moreover, certain of the catalysts display an X-ray powder diffraction pattern at the copper $K_{alpha}$ wavelength peak (0.15405 nanometers) whose characteristic peaks are located between 1 and 32 degrees Bragg, at least the two principal peaks, and often the four principal peaks, of the group VIB metal disulfide(s) such as, e.g., those referenced on card no. 24-513A of the Joint Committee on Powder Diffraction Standards (JCPDS), International Center for Diffraction Data, 1601 Park Lane, Swarthmore, Pa., U.S.A., for molybdenite, on card JCPDS 8-237 for tungstenite, and shown below in Table 1. The diffraction intensity maximum for the principal peak (002) is located at a Bragg angle of 7.0-7.30 degrees of arc and the angular width at half-height of this peak is from 0.5-1.5 degrees on the same scale. The diagram also shows the characteristic peaks, at least the two principal peaks and often the seven principal peaks, of the disulfide of each of the group VIII metals introduced in the preparation, which crystallize in the pyrite system, such as, e.g., referenced in cards JCPDS 11-99 for vaesite or nickel disulfide, JCPDS 3-0772 for cattierite or cobalt disulfide, and JCPDS 6-0710 for pyrite or iron disulfide, which are also shown in Table 1. The angular width at half-height of the principal peak (200) of the major group VIII metal disulfide is from 0.05 to 1 degree in Bragg angles, and preferably from 0.15 to 0.25 degrees. The maximum diffraction intensity of this peak is higher than the diffraction maximum for the principal peak (002) of the major group VI metal disulfide, preferably from 1-3 times higher. The presence of group VIII metal monosulfides can manifest itself in the diffraction pattern, but the height of the principal peak (100) of the major group VIII metal monosulfide must be less than five times, preferably less than one time, that of the principal peak of the disulfide of the same group VIII metal. The height of the principal peak (110) of the major group VIB metal dioxide must be less than 0.5 times that of the principal peak (002) of the disulfide of the same metal, and preferably zero. The maximum diffraction intensity of the peak (or the height of that peak) is defined as being the intensity gathered at that Bragg angle under the conditions of analysis, minus the average intensity gathered between the Bragg angles 9 and 12 degrees under the same conditions.

The catalysts obtained by the method described hereinabove are active for all possible reactions between hydrogen and a hydrocarbon mixture containing sulfur compounds, and in particular, the reactions of hydrogenation, hydrodesulfuration, hydrodenitrogenation, hydrodemetallation, hydrodecyclization, hydrogenolysis and hydrocracking.

Miller Indices of the Principal Peaks of the Group VIB and VIII Metal Disulfides in their Order of Appearance for an Increasing Bragg Angle Between 1 and 32 Degrees, and for Copper $K_{alpha}$ Radiation.

TABLE 1

| | | | | | | | |
|---|---|---|---|---|---|---|---|
| MoS$_2$ | (002) | (103) | (101) | (110) | | | |
| WS$_2$ | (002) | (103) | (101) | (100) | | | |
| NiS$_2$ | (111) | (200) | (210) | (211) | (220) | (311) | (321) |
| CoS$_2$ | (200) | (210) | (211) | (220) | (311) | (231) | (333) |
| FeS$_2$ | (111) | (200) | (210) | (211) | (220) | (311) | (321) |

The following examples illustrate the invention without in any way limiting its scope.

EXAMPLE 1

A closed reaction vessel is prepared, comprising a 5-liter glass round-bottomed flask, provided with a cover having 5 teflon-coated toroidal joints, and placed in a combined heater-magnetic stirrer of the type bearing the trademark ELECTROTHERMAL, model ROTAMANTLE. The flask is connected to a source of argon gas (argon U of Air Liquide Co.) and a line for outflow of gases to the air provided with a bubbler, with a safety bottle and with a wash bottle containing an aqueous solution of technical sodium hydroxide. The cover of the flask is provided with five glass capillary tubes with blunt tips for separate dropwise introduction of reactant solutions. One of the tubes is connected to a reservoir of an aqueous solution of nickel nitrate hexahydrate (R. P. NORMAPUR of PROLABO), another tube is connected to a reservoir of an aqueous solution of ammonium heptamolybdate tetrahydrate (R. P. NORMAPUR of PROLABO), and a third tube is connected to a reservoir of an aqueous ammonium sulfide solution of about 20% by weight (RECTAPUR of PROLABO). The supply tubes for these solutions are made of flexible tubing and also include a common peristaltic pump with three parallel heads of the type bearing the trademark MASTERFLEX. This arrangement permits introduction of the three solutions into the reaction vessel simultaneously and rigorously at the same volume of supply. The fourth and fifth tubes are connected respectively to a reservoir of concentrated nitric acid (R. P. NORMAPUR of PROLABO) and to a shunt upstream of the MASTERFLEX pump in the ammonium sulfide supply tube, using flexible VITON tubing placed in the stators of step motor peristaltic pumps of the type bearing the trademark MPRE of the TACUSSEL Company. The reaction vessel is also equipped with a combined double-junction pH-measuring electrode bearing the trademark INGOLD type 465, connected to a regulating pH-meter bearing the trademark URECTRON 6 TACUSSEL, controlling the rotational speed of the MPRE pumps. The assembly consisting of the electrode, the URECTRON 6, and the MPRE pump controls the introduction into the vessel of controlled quantities of the respective antagonist acid and basic reagents which are nitric acid and ammonium sulfide, permitting the maintenance of the pH of the reaction medium at the desired value. Finally, the flask is provided with a withdrawal tube, whose tip is near the bottom of the flask, and a tube to recycle the mother liquors. The withdrawal tube is connected by a transparent elastomer tube to a shunt of a MASTERFLEX peristaltic pump supplying by a shunt an automatic SORVALL SS-3 centrifuge equipped with a SORVALL type SZENT-GYORGYI and BLUM continuous centrifugation rotor. The exit port of this centrifuge is connected to the recycle tube. A Teflon-coated magnetic bar of a convenient size and shape adapted to the curvature of the bottom of the flask, and turned by the ROTOMANTLE stirrer, facilitates continuous moderate stirring of the reaction mixture.

The reservoirs provided for that purpose are filled with a solution of 75.95 g of nickel nitrate hexahydrate in 280 cm$^3$ of distilled water, a solution of 19.76 g of ammonium heptamolybdate tetrahydrate in 280 cm$^3$ of distilled water, with 300 cm$^3$ of ammonium sulfide solution and 200 cm$^3$ of concentrated nitric acid.

The INGOLD electrode is calibrated with the help of reference solutions of carefully determined pH. Then, 1400 cm$^3$ of distilled de-aerated water is introduced into the reaction flask, the vessel is tightly closed and purged 30 minutes with a current of argon at a rate of 30 liters per hour. The argon flow is then reduced to about 5 liters per hour.

The pH regulatory system is actuated, with the value set at pH 5±0.5 units.

The centrifuge is started, gradually increasing the rotational speed until it attains the value of about 14,000 rpm. At this point, the suction tube supplying the centrifuge can be started, at a moderate rate, so that the distilled water withdrawn and circulating in the centrifuge returns to the flask. The establishment of a permanent and constant rate of withdrawal and recycling and a stabilization of the pH at its set value is permitted to take place.

The pumps are started for the introduction of the reactants, setting their flow rate at about 100 cm$^3$/hour, and the introduction of reactants is continued until all of the metal salts are used. After this, 200 cm$^3$ of distilled water are added to each of the metal salt solution reservoirs and the tubes are rinsed until the distilled water is exhausted. At this point, the introduction of reactants is stopped.

From the moment that the reactants are introduced into the vessel, the reaction medium becomes a dark brown and then becomes black and opaque, indicating that the coprecipitation is effective. Once the phases of introduction of reactants and rinsing have ended, the opacity of the withdrawal line is monitored, and when the withdrawn liquid becomes transparent, the coprecipitation phase is ended.

The moist precipitate is extracted from the centrifuge and placed in a quartz boat, which is then introduced into a horizontal tubular furnace. The laboratory tube of the tubular furnace is purged with a current of argon which is maintained throughout the subsequent steps of drying and calcination. The temperature of the oven is raised to 110° C. and maintained at that level for two hours. At the end of this drying step, the oven temperature is raised to 400° C. and maintained at that level for two hours. At the end of this calcination step, the oven is permitted to cool under an argon current, then the laboratory tube is isolated under argon. The laboratory tube is opened in a glove box which has been purged with argon and filled with argon, and the calcined catalyst is ground in an agate mortar, and then conditioned in a sealed flask in the glove box.

By this method, 43 g of catalyst A according to the invention are obtained.

Using the same procedure, except starting with a solution of 51.40 g of nickel nitrate hexahydrate in 265 cm$^3$ of distilled water and a solution of 31.20 g of ammonium heptamolybdate tetrahydrate in the same amount of distilled water leads to the production of 44 g of catalyst B prepared according to the method of the invention, but not having all of the characteristics of the preferred catalyst according to the invention: in particular, the diffraction diagram does not follow all of the conditions indicated above for the preferred catalysts of the invention.

Using the same procedure but starting with a solution of 89.25 g of nickel nitrate hexahydrate in 250 cm$^3$ of distilled water and a solution of 13.54 g of ammonium heptamolybdate tetrahydrate in the same amount of distilled water produces about 40 g of catalyst C according to the invention.

Using the same procedure, except starting with a solution of 55.14 g of ammonium heptamolybdate tetrahydrate in 240 cm$^3$ of distilled water and without addition of a nickel salt produces about 40 g of catalyst D (comparison).

Using the same procedure, but starting with a solution of 118.38 g of nickel nitrate hexahydrate in 300 cm$^3$ of distilled water and without addition of a solution of molybdenum salt, produces about 35 g of catalyst E (comparison).

Using the same procedure, but starting with a solution of 29.3 g of nickel nitrate hexahydrate in 250 cm$^3$ of distilled water and a solution of 41.49 g of ammonium heptamolybdate tetrahydrate in the same amount of distilled water produces about 38 g of catalyst F (comparison).

Using the same procedure, but starting with a solution of 39.27 g of nickel nitrate hexahydrate in 250 cm$^3$ of distilled water and a solution of 36.83 g of ammonium heptamolybdate tetrahydrate in the same amount of distilled water results in about 45 g of catalyst M according to the invention.

Using the same procedure, but starting with a solution of 47.79 g of nickel nitrate hexahydrate in 250 cm$^3$ of distilled water and a solution of 32.86 g of ammonium heptamolybdate tetrahydrate in the same amount of distilled water produces about 43 g of catalyst N according to the invention.

Table 3 summarizes the elementary analyses for catalysts A–F and M and N, by X-ray flourescence for nickel and molybdenum, and by combustion for sulfur. It can be seen that the ratio of the number of atoms of sulfur to the total number of atoms of metal is between 1.4 and 2.2 for all of the preparations according to the invention. Table 3 also summarizes the values for the specific surface measured for the catalysts by nitrogen sorptometry by means of a SORPTOMATIC apparatus produced by CARLO ERBA CO.

BRIEF DESCRIPTION OF THE DRAWINGS

FIGS. 1–7 show the X-ray diffraction diagrams obtained for catalysts A–F, using radiation emitted by a copper anticathode tube and filtered at the wavelength of the $K_{alpha}$ peak of that metal (0.15405 nanometers) using a goniometer bearing the trademark PHILLIPS model PW1050 provided with a rear monochrometer. The signal was recorded by a counter receiving signals from a detector; sample and detector advance step-by-step. The counting time interval is chosen at 5 seconds per step, the step being set at 0.025 of a Bragg degree theta. This method is described, e.g., in "Physical Methods for the Study of Minerals and Solid Materials" by J. P. Eberhardt, pages 195ff (editions DOIN, Paris, 1976).

On FIGS. 1–7, the abscissa scale is graduated in Bragg angles and the ordinate is calibrated in arbitrary units of intensity of diffracted radiation. In order to better compare the diagrams of the various catalysts, having variable nickel contents, the diagrams for catalysts D, F, B, A, M and N are represented on FIGS. 1–4 and 10 and 11, respectively, on the same scale, and the diagrams for catalysts A, C, and E are represented on FIGS. 5–7, respectively, on the same scale which, however, is different from the scale on FIGS. 1–4, 10 and 11. It can be seen from the figures that only catalysts A, C, M and N have a diffraction diagram corresponding to the particular definition of catalysts according to the invention. This is again shown by examining Table 4, which regroups for catalysts A–F, M and N the values for the Bragg angle u at the top of the (002) peak for molybdenite, the angular width v at half-height for this peak, the ratio w of the height of the principal peak (200) of vaesite or nickel disulfide to that of this peak, the ratio x of the height of the principal peak (110) of molybdenum dioxide to that of this peak, the angular width y at half-height of the principal peak of vaesite and the reciprocal z of the ratio of the height of this last peak to that of the principal peak (100) of nickel monosulfide or millerite.

The peaks of these different compounds which can be present in the catalysts are located by the reference letters a–m. The correspondence is given in Table 2, hereinbelow.

TABLE 2

| Peaks | a | b | c | d | e | f | g | h | i | j | k | l | m |
|---|---|---|---|---|---|---|---|---|---|---|---|---|---|
| MoS$_2$ | 002 | 101 | 103 | 110 | | | | | | | | | |
| MoO$_2$ | | | | | | | | | | | | | 110 |
| NiS$_2$ | | | | | 111 | 200 | 210 | 211 | 220 | 311 | 321 | | |
| NiS | | | | | | | | | | | | 100 | |

Catalysts A–F, M and N are submitted to a catalytic hydrorefining test and to another test of catalytic hydrodesulfuration of dibenzothiophene, and their activities are compared to that obtained in the same tests for two supported hydrorefining catalysts marketed by the PROCATALYSE Company, namely catalysts denoted HR 306 based on cobalt and molybdenum and that denoted HR 346 based on nickel and molybdenum, both catalysts being supported on gamma-alumina. The conditions of these catalytic tests are defined in Table 5. The hydrorefining test permits measurement of the extent of hydrogenation of toluene X, the extent of isomerization of cyclohexane I, and the extent of hydrodecyclization of toluene H, wherein:

t = concentration of toluene in the effluent;
cC6 = concentration of cyclohexane in the effluent;
mcC5 = concentration methylcyclopentane in the effluent;
ecC5 = concentration of ethylcyclopentane in the effluent;
S2mcC5 = sum of the concentrations of the dimethylcyclopentanes in the effluent;
mcC6 = concentration of methylcyclohexane in the effluent; and X = 100(mcC6 + ecC5 + S2mcC5)/(t + mcC6 + ecC5 + S2mcC5)
I = 100(mcC5)/mcC5 + cC6)
H = 100(S2mcC5 + ecC5)/(mcC6 + ecC5 + S2mcC5)

The hydrodesulfuration test permits the measurement of the rate V of hydrodesulfuration of dibenzothiophene expressed as moles converted per second and per gram of catalyst.

Table 6 shows the results of the hydrorefining and hydrodesulfuration tests. It clearly shows the superior hydrorefining activity of catalysts A, C, M and N according to the invention, compared to prior art catalysts HR 306 and HR 346, on the one hand, and compared to catalysts such as D, E and F, on the other hand, which have neither a composition nor a diffraction diagram corresponding to the definitions of the catalysts of the invention. Catalyst B, prepared according to the method of the invention but whose diffraction diagram does not correspond to that of the preferred catalysts of the invention, is less effective in hydrorefining than catalysts A, C, M and N. However, it is more active in hydrorefining than the prior art catalysts. With regard to the hydrodesulfuration activities, catalysts A, C, M and N according to the invention are equivalent, perhaps slightly more active, than the prior art catalysts. Catalysts D and F which neither have the composition nor the diffraction diagram corresponding to the definitions of the invention, are significantly less active.

TABLE 3

| Catalyst | Ni % wt | Mo % wt | S % wt | Ni/ Ni + Mo atom | S/Ni + Mo atom | S m$^2$/g |
|---|---|---|---|---|---|---|
| A | 31 | 20.2 | 34.2 | 0.715 | 1.447 | 43 |
| B | 20.5 | 32.7 | 39.5 | 0.5062 | 1.789 | 38 |
| C | 43 | 14 | 37.1 | 0.834 | 1.662 | 40 |
| D | 0 | 61 | 36.3 | 0.0 | 1.780 | 78 |
| E | 64 | 0 | 33.7 | 1.0 | 0.966 | 12 |
| F | 12.2 | 42 | 38.6 | 0.322 | 1.869 | 56 |
| M | 14 | 35.4 | 42.7 | 0.393 | 2.197 | 69 |
| N | 16.6 | 30.7 | 40.5 | 0.469 | 2.10 | 51 |

TABLE 4

| Catalyst | u* | v* | w | x | y | z |
|---|---|---|---|---|---|---|
| A | 7.00 | 1.35 | 1.92 | 0.00 | 0.20 | 0.41 |
| B | 7.05 | 1.30 | 0.68 | 0.05 | 0.20 | 0.48 |
| C | 7.10 | 1.50 | 1.19 | 0.32 | 0.25 | 4.62 |
| D | 6.90 | 1.05 | 0.00 | 0.20 | 0.00 | 0.00 |
| E | 0.00 | 0.00 | a | a | 0.00 | b |
| F | 7.20 | 1.10 | 0.00 | 0.03 | 0.00 | a |
| L | 7.05 | 0.75 | 0.53 | 25.4 | a | 0.55 |
| M | 7.15 | 1.40 | 1.49 | 0.00 | 0.18 | 0.14 |
| N | 7.15 | 1.50 | 1.34 | 0.00 | 0.20 | 0.11 |

*: Degrees on the scale of BRAGG angles for diffraction of the copper $K_{alpha}$ radiation.
a: Indeterminate
b: Infinite.

TABLE 5

HYDROREFINING TEST

Presulfuration:
(Only for supported catalysts)
Charge: Toluene — 20% by wt.
Cyclohexane — 78% by wt.
DMDS — 2% by wt.
Conditions: 6 MPa
V.V.H. = 2
$H_2$/HC = 450 Nl/l
Injection at 200° C.
2 hours at 280°
2 hours at 320° C.
2 hours at 350° C.
Test:
Identical, but a 2% by weight charge of thiophene instead of DMDS for 6 hours at 350° C. and V.V.H. = 6. Analysis of the effluent by vapor phase chromatography every 30 minutes.

HYDRODESULFURATION TEST

Temperature: 257° C.
Charge: $H_2$ + 0.0164 vol % DBT
Total pressure: 2.4 MPa
Time: 15 hours
DMDS: Dimethyl-disulfide
DBT: dibenzothiophene

TABLE 6

| Catalyst | X | I | H | V × 10$^8$ |
|---|---|---|---|---|
| A | 73.0 | 1.10 | 24.8 | 48 |
| B | 56.0 | 1.83 | 30.4 | 33 |
| C | 64.5 | 1.12 | 27.7 | 43 |
| D | 1.5 | 0.15 | 57.6 | 9.3 |
| E | 0.1 | 0.01 | 0.5 | 1.7 |
| F | 37.3 | 0.40 | 15.5 | 25 |
| M | 78.8 | 2.23 | 28 | 57 |
| N | 84.5 | 2.7 | 31 | 65 |
| HR 306 | 16.1 | 0.20 | 5.8 | 50 |
| HR 346 | 29.5 | 0.40 | 13.0 | 45 |
| G | 75.3 | 1.2 | 26.0 | 51 |
| H | 70.0 | 1.05 | 24.5 | 44 |
| I | 52.8 | 0.40 | 19.5 | 17.5 |
| J | 65.6 | 0.90 | 23.0 | 39 |
| K | 10.0 | 0.10 | 6.0 | 4.4 |
| L | 12.0 | 0.17 | 6.5 | 5 |

EXAMPLE 2

Using the procedure for the preparation of catalyst A, as set forth in Example 1, catalysts G, H, I, J and K are prepared, with the exception that the pH of coprecipitation is set at 4.5 for G, 8 for H, 4 for I and 9 for J, and without controlling the pH for K.

The activities of catalysts G-K in catalytic hydrorefining and hydrodesulfuration tests are also shown in Table 6, and they may be compared with those obtained for catalyst A according to the invention for whose preparation the pH was regulated at a value of 5. It can be seen that the method of preparation according to the invention only results in catalysts having a high activity when the pH is maintained at a value between 4.5 and 8 over the course of co-precipitation. Maintenance of the pH within these defined limits for the method of preparation according to the invention is especially important to obtain catalysts with a hydrodesulfuration activity superior to or comparable to prior art catalysts.

EXAMPLE 3

Catalyst L is prepared by the procedure used to prepare catalyst A in Example 1, except that the coprecipitation is effected in the presence of air.

The X-ray diffraction diagram of catalyst L is also shown on FIG. 9 (where it can be compared with the corresponding diagram for catalyst A reproduced on the same scale (FIG. 8) and the characteristics of the diagram are indicated in Table IV. The catalyst is rich in molybdenum dioxide because the height of the principle peak of this compound is more than ten times that of the (002) peak of molybdenite. The activities of catalyst L measured in the hydrorefining and hydrodesulfuration tests are shown in Table VI. They are quite low compared to those obtained for catalyst A.

This Example therefore illustrates the necessity of effecting coprecipitation under a current of inert gas. Moreover, if the calcination is effected in the presence of a reducing or oxidizing gas, the metallic sulfides are not stable.

EXAMPLE 4

Catalysts A1-A8 are prepared by the procedure of Example 1 for catalyst A, except that the metal salt solutions shown in Table 7 are used as starting materials. The activities of these catalysts in the hydrorefining and hydrodesulfuration tests are compared to those of catalyst A and prior art catalysts HR306 and 346 in Table 8. This example shows that the catalysts prepared according to the method of the invention and based on different combinations of at least one sulfide of cobalt, iron and/or nickel, with at least one sulfide of molybdenum and/or tungsten represent significant progress compared to supported prior art catalysts with respect to hydro-refining activity. However, catalyst A2 which associates nickel and cobalt with molybdenum is the most active.

TABLE 7

| | Quantity of metallic salt utilized per 280 cm$^3$ of solution (g) | | | | |
|---|---|---|---|---|---|
| CATALYST | Mo (1) | W (2) | Ni (3) | Co (4) | Fe (5) |
| A1 | 19.8 | 0.0 | 0.0 | 76.0 | 0.0 |
| A2 | 19.8 | 0.0 | 38.0 | 38.0 | 0.0 |
| A3 | 19.8 | 0.0 | 0.0 | 0.0 | 105.5 |
| A4 | 0.0 | 29.5 | 76.0 | 0.0 | 0.0 |
| A5 | 0.0 | 29.5 | 0.0 | 76.0 | 0.0 |
| A6 | 0.0 | 29.5 | 38.0 | 38.0 | 0.0 |
| A7 | 0.0 | 29.5 | 0.0 | 0.0 | 105.5 |
| A8 | 9.9 | 14.8 | 76.0 | 0.0 | 0.0 |

(1): $(NH_4)_6Mo_7O_{24}.4H_2O$ — PM = 1235.86
(2): $(NH_4)_{10}W_{12}O_{41}.5H_2O$ — PM = 3162.64
(3): $Ni(NO_3)_2.6H_2O$ — PM = 290.80
(4): $Co(NO_3)_2.6H_2O$ — PM = 291.05
(5): $Fe(NO_3)_3.9H_2O$ — PM = 404.0

TABLE 8

| CATALYST | X | I | H | V × 10⁸ |
|---|---|---|---|---|
| HR 306 | 16.1 | 0.2 | 5.8 | 50 |
| HR 346 | 29.5 | 0.4 | 13.0 | 45 |
| A | 73.0 | 1.1 | 24.8 | 48 |
| A1 | 65.0 | 1.0 | 22.0 | 50 |
| A2 | 75.0 | 1.15 | 24.0 | 50 |
| A4 | 71.2 | 1.0 | 24.0 | 46 |
| A5 | 62.5 | 0.8 | 22.0 | 36 |
| A6 | 72.3 | 1.1 | 25.0 | 48 |
| A7 | 51.0 | 0.5 | 18.0 | 26 |
| A8 | 72.0 | 1.05 | 25.0 | 48 |
| A9 | 63.0 | 0.8 | 22.0 | 34 |
| A10 | 66 0 | 1.2 | 26.0 | 36 |
| A11 | 72.0 | 1.0 | 25.0 | 45 |
| A12 | 74.0 | 1.2 | 28.0 | 50 |
| A13 | 19.0 | 0.3 | 8.0 | 46 |
| A14 | 13.0 | 0.2 | 7.0 | 20 |

EXAMPLE 5

Using the procedure of Example 1 for catalyst A, catalysts A9, A10, A11 and A12 are prepared, except starting with, respectively, nickel sulfate hexahydrate and nickel chloride hexahydrate in place of nickel nitrate hexahydrate, ammonium dimolybdate and the ammonium salt of phosphomolybdic acid instead of ammonium heptamolybdate. The amounts of the salts are determined by using in each case the same number of atoms of nickel and molybdenum as used for the preparation of catalyst A. The finished catalysts have the same ratio of the atoms of nickel to the total number of metal atoms as in catalyst A, but A9 contains sulfur bound in the form of sulfates, A10 contains chloride and A12 contains phosphorus.

Catalysts A9-A12 are evaluated in the catalytic hydrorefining and hydrodesulfuration tests and compared to catalyst A and to catalysts HR 306 and HR 346 of the prior art. The results obtained are shown in Table 8.

It can be seen that catalysts A9 and A10 are a bit less active than catalyst A, the catalyst A11 is equivalent to A and that A12 has a higher activity than A. Catalysts A9-A12 are nevertheless all more active in hydrorefining than the prior art catalysts, and comparable or superior in hydrodesulfuration. These results illustrate the fact that the nature of the soluble salt of the metal(s) of group VIII does not have a very important influence on the quality of the catalyst prepared according to the method of the invention, although nickel nitrate is nevertheless preferred. With respect to the choice of the ammonium salt of the polyanion of the group VIB metal(s), it is preferred to use a salt of a phosphorus-containing heteropolyanion, especially to increase the acidic properties of the catalyst.

EXAMPLE 6

A solution of 76 g of cobalt nitrate hexahydrate in 300 cm³ of distilled water and a solution of 19.8 grams of ammonium heptamolybdate tetrahydrate in 300 cm³ of distilled water are prepared. The solutions are heated to 70° C., and then mixed. The mixture is introduced slowly into a flask, under vigorous agitation, containing 500 cm³ of ammonium sulfide in a 20 weight % aqueous solution, maintained at 70° C. When the addition is complete, the flask is maintained under agitation at 70° C. until the total evaporation of the liquid. The dry product is recovered, heated from ambient temperature to 400° C. in 250 min., maintained at 400° C. during 4 hours, then cooled to ambient temperature, all under a current of $H_2$ containing 3% by volume of $H_2S$. At the end of this resulfuration, the solid is swept by a current of nitrogen, and then a current of argon, after which it is conditioned under argon. About 40 g of catalyst A13 is thus recovered, prepared according to the original "HSP" method described by Topsoe et al (loc.cit.) for the preparation of mixed sulfides of cobalt and molybdenum.

A solution of 7.6 g of cobalt nitrate hexahydrate and 1.98 g of ammonium heptamolybdate tetrahydrate in 1 liter of distilled water is prepared in a flask. The solution is vigorously stirred and heated at 100° C. To it is slowly added 400 cm³ of a solution of 2% by weight ammonium sulfide. When the addition is complete, the preceding procedure is effected for evaporation, and resulfuration of the dry residue under a current of hydrogen at 15 volume % of $H_2S$. In this fashion are obtained about 4 g of catalyst A14 prepared according to the varient of the "HSP" method described by Breysse et al (loc.cit.).

Catalysts A13 and A14 are submitted to the hydrorefining and hydrodesulfuration tests. The results obtained are reported in Table 8 and can be compared with those obtained by catalyst A1 prepared by the method according to the invention. Catalysts A1, A13 and A14 have the same elementary composition. Catalysts A1 and A13 have comparable hydrodesulfuration activities, but A1 is much more active in hydrorefining. Catalyst A14 is the least active in both tests.

This example demonstrates that the method of preparation according to the invention differs in its procedures from the "HSP" method, leads to catalysts having an identical elemental composition but which are much superior to those previously known. Among the known prior art methods, the "HSP" method is perhaps the closest to the method of preparation according to the invention.

EXAMPLE 7

Fifty grams of catalyst A are prepared according to Example 1 and including an extrusion step to obtain cylindrical particles of a diameter of 0.8 mm and an average length of 5 mm, which are then introduced, with the exclusion of atmospheric air, into the tubular reactor of a pilot unit of the type CATATEST, sold by GEOMECANIQUE CO. This type of apparatus is designed to effect catalytic hydrorefining tests of actual petroleum cuts, on a small scale, but under continuous industrial operating conditions.

After a dry nitrogen purge, the CATATEST is pressurized to 6 MPa with pure hydrogen. The hydrogen flow is set at 100 l/h (NTP), and the temperature of the heating jackets is raised at a rate of about 10° C. per minute. When the reactor temperature reaches 150° C., the unit is charged with a middle gas oil, which has been withdrawn from a distillation column of liquid effluents of a slow coking unit. The gas oil has an initial boiling point of 160° C. and a final boiling point of 350° C., a sulfur content of about 0.5% by weight, and a nitrogen content of about 0.05% by weight. It is also characterized by a bromine index (IBr) of 20 (in g/100 g) and a cetane number of 40, indicating a high degree of unsaturation of the carbon-carbon bonds. The use of this gas oil as a diesel fuel base and/or a domestic fuel normally requires severe hydrorefining which effects at least 90% desulfuration, 75% denitrogenation, 95% reduction of the IBr (hydrogenation of the olefins) and increase of the cetane number to a value higher than 45.

The HR 346 prior art catalyst permits these criteria to be met for the gas oil by, for example, setting the hourly space velocity (VVH) at 3 liters of charge per liter of catalyst per hour, at a temperature of 360° C. and a total pressure of 6 MPa.

For the present example, the flow of the gas oil is fixed at the inlet of the CATATEST at 500 ml/h, the hydrogen flow is supplied at a rate of 200 l/h, and the reactor temperature is raised at a rate of 10° C./mn until the temperature reaches 360° C., which temperature is maintained uniformly thereafter in the entire reactor. The hydrotreated gas oil produced during the first 24 hours of stabilization is discarded, after which the accumulated liquid obtained every two hours is withdrawn, treated with finely divided zinc oxide to eliminate the dissolved hydrogen sulfide, and analyzed. The flow rate of the gas oil is varied so that the effluent has a residual nitrogen content of 0.0120% by weight: this level is attained at a flow rate of 600 ml/h, i.e., a VVH of 12. At this rate, the residual sulfur content is 0.20% by weight, the bromine index is less than 1, and the cetane number is higher than 50.

By comparison with catalyst HR 346, catalyst A according to the invention thus permits reaching the most difficultly attainable specifications required for use of the gas oil, diminishing by a factor of four the volume of catalyst necessary, without changing the operating conditions.

The test has also been conducted by regulating the gas oil flow at the inlet of the CATATEST to obtain a residual sulfur content of the effluent of 0.05% by weight. This value is achieved at a flow rate of 170 ml/h, i.e., a VVH of 3.4. Moreover, the residual nitrogen content is 0.0010% by weight, and the cetane number reaches a value of about 60. According to this procedure, the use of the catalyst according to the invention permits a gain of only 10-12% by volume of catalyst with respect to the prior art catalyst to achieve 90% desulfuration of the gas oil, but the other characteristics of the refined product are greatly improved, to the point where a great advantage is found in using this effluent industrially as a mixture with other less refined cuts to produce a product whose overall characteristics meet the required specifications.

What is claimed is:

1. A process for preparing a hydrotreatment catalyst comprising an intimate mixture of at least one group VI B metal sulfide and at least one group VIII metal sulfide characterized in that it comprises the following steps:
    (a) reacting, at a pH maintained at a value of 4.5 to 8, an aqueous solution of at least one soluble salt of at least one group VIII metal and at least one ammonium salt of a polyanion of at least one group VI B metal, with at least one water-soluble sulfiding agent, under conditions which form a coprecipitate of sulfides;
    (b) separating the resultant precipitate from the mother liquors;
    (c) drying said precipitate; and
    (d) calcining the dried precipitate; all of said steps being effected under an inert atmosphere.

2. A process according to claim 1, characterized in that, during step (a) the pH is maintained at a value of from 5 to 7.

3. A process according to claim 2, characterized in that the pH is regulated to ±0.5 units.

4. A process according to claim 1, characterized in that the proportions of reactants used in step (a) are such that the ratio of the number of atoms of the group VIII metal to the total number of metal atoms is from 0.35 to 0.95, and the ratio of the number of sulfur atoms to the total number of metal atoms is from 1.2 to 2.2.

5. A process according to claim 1, characterized in that the soluble group VIII metal salt is a nitrate of a divalent cation.

6. A process according to any of claim 1, characterized in that the sulfiding agent is an aqueous ammonium sulfide solution.

7. A process according to claim 1, characterized in that the group VIII metal is nickel, cobalt or iron, and the group VI B metal is molybdenum or tungsten.

8. A process according to claim 7, characterized in that the group VIII metal is nickel and the group VI B metal is molybdenum.

9. A process according to claim 1, characterized in that step (a) is effected at a temperature of from 0° to 50° C.

10. A process according to claim 1, characterized in that the separation in step (b) is effected continuously during step (a).

11. A process according to claim 1, characterized in that the precipitate separated in step (b) is shaped.

12. A process according to claim 11, characterized in that, in the course of shaping, at least one binder or porogen is incorporated, in a proportion of from 5 to 95% by weight with respect to the weight of the finished catalyst.

13. A catalyst comprising an intimate mixture of at least one sulfide of a group VI B metal and at least one sulfide of a group VIII metal, characterized in that said sulfides are present in a stoichiometry of from 1.2 to 2.2 atoms of sulfur per atom of metal, a ratio of the number of atoms of group VIII metal to the total number of metal atoms of from 0.35 to 0.95, and having a crystallagraphic structure of molybdenite for the group VI B metal sulfide and of pyrite for the group VIII metal sulfide, said intimate mixture exhibiting an X-ray powder diffraction diagram at the wave length of the copper $K_{alpha}$ peak having at least two principle peaks characteristic of the group VI B metal(s) disulfide(s) the height of the peak denoted (002) in the Miller indices being situated at a Bragg angle of from 7.0 to 7.30 degrees and its angular width at half-height being from 0.5 to 1.5 degrees, the diffraction diagram also having at least the two principle peaks of the disulfide of each of the group VIII metals used, the angular width at half-height of the most intense peak denoted (200) in the Miller indices of the major group VIII metal disulfide being from 0.05 to 1 degree, the diffracted intensity at the top of this peak being higher than the diffracted intensity at the height of the (002) peak of the major group VI B metal disulfide, the diffraction diagram being such that, when peaks characteristic of a group VIII metal monosulfide are present, the height of the principle peak (100) is less than 5 times that of the principle peak (200) of the disulfide of the same metal, and such that, when peaks characteristic of the dioxide of the major group VI B metal appear, the height of the principle peak (110) of this dioxide is less than 0.5 times that of the principle peak (002) of the disulfide of the same metal.

14. A catalyst according to claim 13, characterized in that the X-ray powder diffraction spectrum exhibits at least the four principle peaks characteristic of the disulfide(s) of the group VI B metal(s) and at least the seven principle peaks of the disulfide of each of the group VIII metals used.

15. A catalyst according to claim 13, characterized in that the group VIII metal is nickel and the group VI B metal is molybdenum.

16. A catalyst according to claim 13, characterized in that said catalyst has a specific surface, measured by nitrogen sorptometry, of from 10 to 200 m²/g.

17. A process for preparing a hydrotreatment catalyst comprising an intimate mixture of at least one group VI B metal sulfide and at least one group VIII metal sulfide, said process comprising the following steps:
  (a) reacting, at a pH maintained at a value of 4.5 to 8, an aqueous solution of at least one soluble salt of at least one group VIII metal and at least one ammonium salt of a polyanion of at least one group VI B metal, with at least one water-soluble sulfiding agent, under conditions which form a coprecipitate of sulfides;
  (b) separating the resultant precipitate from the mother liquors;
  (c) drying said precipitate; and
  (d) calcining the dried precipitate;
all of said steps being effected under an inert atmosphere wherein the proportions of the reactants are such that the ratio of the number of atoms of the group VIII metal to the total number of metal atoms is from 0.35 to 0.95, and the ratio of the number of sulfur atoms to the total number of metal atoms is from 1.2 to 2.2.

18. A catalyst produced by a process comprising the following steps:
  (a) reacting, at a pH maintained at a value of 4.5 to 8 an aqueous solution of at least one soluble salt of at least one Group VIII metal and at least one Group VIB metal, with at least one water-soluble sulfiding agent, under conditions which form a coprecipitate of sulfides;
  (b) separating the resultant precipitate from the mother liquors;
  (c) drying said precipitate; and
  (d) calcining the dried precipitate;
all of said steps being effected under an inert atmosphere wherein the proportions of the reactants are such that the ratio of the number of atoms of the Group VIII metal to the total number of metal atoms is from 0.35 to 0.95, and the ratio of the number of sulfur atoms to the total number of metal atoms is from 1.2 to 2.2.

* * * * *